(12) United States Patent
Kawabe

(10) Patent No.: US 6,327,229 B1
(45) Date of Patent: Dec. 4, 2001

(54) STORAGE DEVICE AND ITS SEEK CONTROL METHOD

(75) Inventor: Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/797,344

(22) Filed: Mar. 1, 2001

(30) Foreign Application Priority Data

Sep. 29, 2000 (JP) .................................. 12-298665

(51) Int. Cl.⁷ .............................. G11B 17/22; G11B 7/00
(52) U.S. Cl. ........................................ 369/32; 369/44.28
(58) Field of Search ............................. 369/32, 13, 116, 369/44.28, 44.29, 44.34, 44.35, 44.36, 44.32, 53.2, 47.1, 47.15, 53.11; 360/78.14

(56) References Cited

U.S. PATENT DOCUMENTS

| | | | |
|---|---|---|---|
| 5,495,458 | * | 2/1996 | Ikeda et al. .............................. 369/32 |
| 5,901,121 | * | 5/1999 | Yamashita et al. ................ 369/44.28 |
| 5,933,397 | * | 8/1999 | Yamashita et al. ................ 369/44.28 |

FOREIGN PATENT DOCUMENTS

| | | |
|---|---|---|
| 61168132 | 7/1986 | (JP) . |
| 62223820 | 10/1987 | (JP) . |
| 5135376 | 6/1993 | (JP) . |
| 0132844 | 5/2000 | (JP) . |

\* cited by examiner

*Primary Examiner*—Ali Neyzari
(74) *Attorney, Agent, or Firm*—Greer, Burns & Crain,Ltd.

(57) ABSTRACT

A seek control unit divides a seek control section into four segments, i.e., an acceleration segment, a maximum constant-velocity segment, a deceleration segment and a minimum constant-velocity segment. During the migration from the acceleration segment to the deceleration segment, the seek control unit newly provides a maximum constant-velocity control segment in which the maximum velocity $V_d$ after acceleration remains unvaried. A time tuning unit adjusts and sets a period of time $T_{C2}$ of the maximum constant-velocity control segment so as to minimize at all times a period of time $T_{C1}$ of the minimum constant-velocity control segment based on the minimum velocity $V_C$ after termination of the deceleration control with respect to variances of the seek distance to the target track.

14 Claims, 10 Drawing Sheets

VELOCITY

ACCELERATION

POSITION

F I G. 6
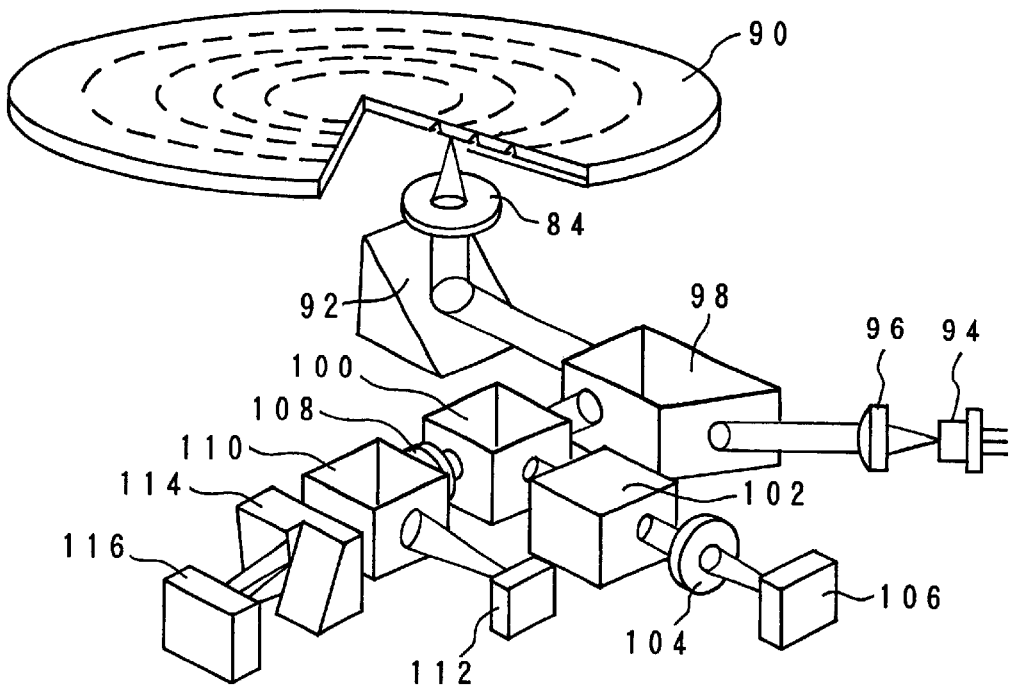

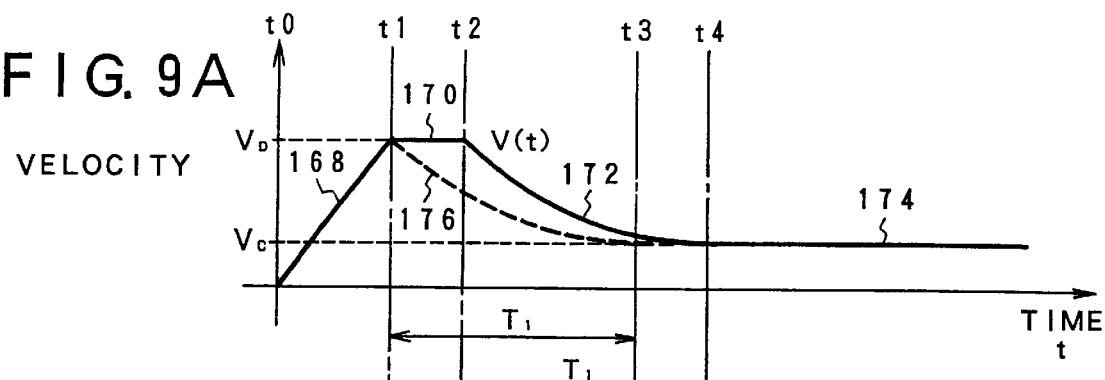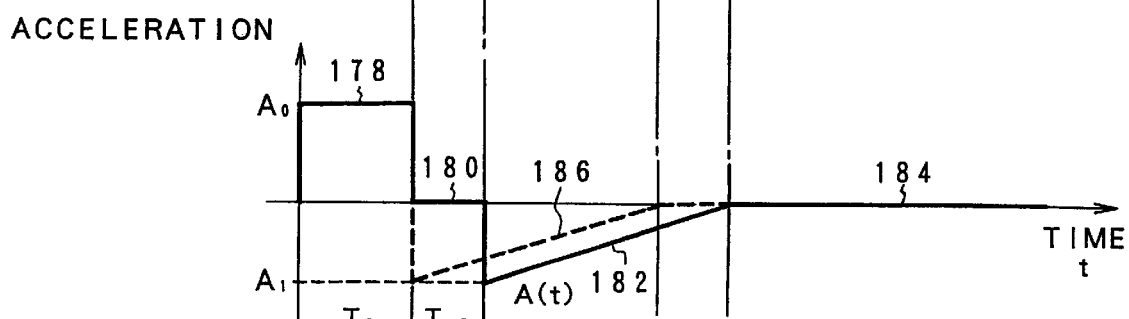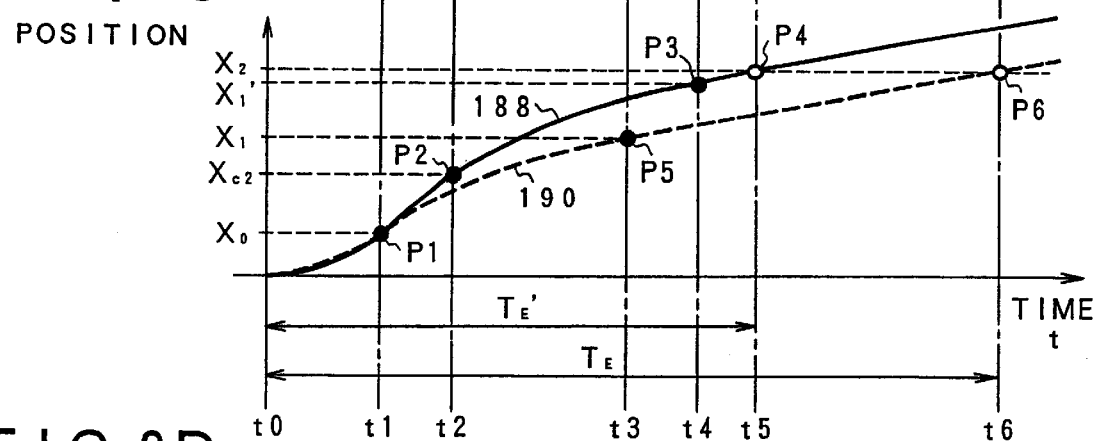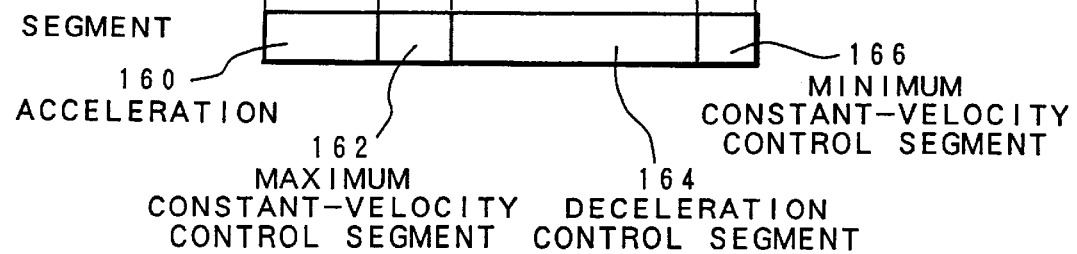

STORAGE DEVICE AND ITS SEEK CONTROL METHOD

BACKGROUND OF THE INVENTION

1. Field of the Invention

The present invention relates generally to a storage device and its seek control method providing a seek control for moving a head in a disk radial direction by drive of an actuator to position the head at a target track, and more particularly to a storage device and its seek control method improving the seek performance through a reduction of the seek time while keeping the stability of lead-in to a target track in the short distance seek not exceeding several tens of tracks.

2. Description of the Related Arts

In conventional information storage devices, in particular removable disk units represented by optical disk units, disks are removed or mounted for use with a need to provide a stable seek control against various disturbances proper thereto. For example, fixed disk units such as hard disk units are rarely affected by disturbances in the track radial direction arising from the disk eccentricity, whereas the optical disk units, e.g., a 3.5 inch 1.3 GB magneto-optical disk may suffer from a radial disturbance as much as 50 $\mu$m relative to 0.9 $\mu$m track pitch. In such disturbance conditions, a stable migration from the target track seek control to the track following control may remarkably be impaired, which may lead to frequent retries in the track following control and thus to a heavy degradation of the drive performances. To cope with this, the seek control upon the migration to the track following control provides a velocity control so as to allow the radial relative velocity with respect to the target track to be a desired value. In a typical velocity control, the target velocity corresponding to the number of remaining tracks to the target track is acquired by derivation from a previously provided table or from calculating expressions.

FIG. 1 is a block diagram of the conventional velocity control. A tracking error signal from a tracking error signal detection circuit 320 is converted into a TES zero-cross signal TZCS by a zero-cross signal detection circuit (TZC circuit) 300. A position/velocity detector 302 acquires a position signal and a relative velocity signal in the disk radial direction of an objective lens mounted on the head moving mechanism of the actuator. From this position signal, a target velocity generator 304 issues a target velocity signal. An addition unit 306 finds a difference between the relative velocity signal and the target velocity signal to issue a velocity error signal, which in turn is fed to a phase compensator 308 for proportional gain or phase compensation to obtain a velocity feedback signal. The position signal is fed to a target acceleration generator 312 to obtain a target acceleration signal at the same time. The target acceleration signal results in an acceleration feedforward signal serving as an acceleration signal for moving the actuator to the target track. The velocity feedback signal and the acceleration feedforward signal are added together in an addition unit 314 at the output stage, the added signal resulting via a driver 316 in a seek control signal for driving a head moving mechanism 318. Upon the acceleration, a switch 310 may be opened so as to permit the output of only the acceleration feedforward signal without any output of the velocity feedback signal.

In such a conventional seek control, however, the signal quality of the TES zero-cross signal TZCS may possibly induce any degradation of both the position signal and the relative velocity signal, with the result that the velocity feedback signal may become noisy. This deficiency remarkably appears in the low-velocity region immediately before the migration to the track lead-in. In the event of occurrence of hunting where the actuator velocity may vary to a great extent by noises, the target track may be reached previous to the recovery of the hunting. Accordingly, in the case of seek control in the low-velocity region immediately before lead-in to the track or of low-velocity seek control as in the short distance seek crossing a relatively short track interval, the influences of the noises need to be minimized. In order to solve such a problem, the present inventors conceived a way of generating a target velocity function or a target velocity relative to the elapsed time from the start of seek control, instead of the conventional generation of the target velocity or the target acceleration relative to the position. This seek velocity control system generating a target velocity through the input of the elapsed time is free from any influences by the position detection errors or detection noises, with the result that the effects of the noises on the velocity feedback signals can be reduced to a minimum.

FIGS. 2A to 2C are time charts of the short distance seek control system using the method conceived by the present inventors. Herein, with respect to the time t on the axis of abscissas, FIG. 2A depicts the velocity, FIG. 2B depicts the acceleration and FIG. 3C depicts the position. The seek control section is divided into three segments, i.e., an acceleration control segment, a deceleration control segment and a constant-velocity control segment such that the respective control segments are changed over depending on the elapsed time from the start of seek. In the acceleration control segment immediately after the start of seek, the actuator is subjected to an acceleration control at a certain acceleration $A_0$ for a predetermined time $T_0$ or for a predetermined distance $X_0$ so that the relative velocity $V_D$ upon the termination of acceleration is measured. In the next deceleration control segment, the decelerated acceleration control and the velocity control are carried out at one time. From the detected velocity $V_D$ upon the changeover to the deceleration, the decelerated acceleration control figures out a target decelerated acceleration trajectory A(t) of FIG. 2B for deceleration to a predetermined velocity $V_C$ allowing a changeover to the track following control for the target track in a predetermined time $T_1$ using $$A(t) = A_1\left(1 - \frac{t}{T_1}\right) \tag{1}$$

This decelerated acceleration trajectory A(t) is a function achieving an acceleration $A_1$ at the start of deceleration and acceleration zero after the elapse of time $T_1$. In this case, the acceleration $A_1$ at the start of deceleration is derived from $$A_1 = \frac{2(V_C - V_D)}{T_1} \tag{2}$$

A target velocity trajectory V(t) is derived on the basis of the decelerated acceleration $A_1$ of the expression (1) from the following expression, to represent the trajectory at the time $T_1$ of FIG. 2B. The target velocity V(t) at that time is represented by the time function $$V(t) = V_D + A_1 t\left(1 - \frac{t}{2T_1}\right) \tag{3}$$

achieving the velocity $V_C$ after the elapse of time $T_1$. Afterward, a constant-velocity control is provided at the target velocity $V_C$ and, when reaching the vicinity of the target track, a migration is carried out to the track following control. The migration to the track following control is effected for example by providing a seek control till the track precedent one track to the target track, whereat a deceleration pulse is issued to allow a movement to a region capable of follow-up on the target track previous to the migration to the track following control. Generation of such a target trajectory reducing the target velocity and the target decelerated acceleration depending on the elapsed time is advantageous in lessening the influences of variances of viscosity resistance on the actuator moving mechanism relying on the velocity variations or in suppressing the excited vibrations of the mechanism arising from the rapid change of acceleration.

In the event of the control generating the target trajectory based on the elapsed time, however, a longer seek distance to the target track may cause an extension of only the time of movement to the target track by the constant-velocity control at the constant velocity $V_C$ after the termination of deceleration, that is, only the time $T_{C1}$ of FIG. 2B, resulting in an extended seek time proportional to the distance to the target track. Referring to FIGS. 1 and 2A to 2C, this problem is described with a seek controller by way of example employed in the optical disk unit making access to the optical disk. Although the optical disk can be for example a phase change (PD) type optical disk or magneto-optical (MO) disk, the optical disk unit making access to the magneto-optical disk is typically contemplated herein. In the acceleration control segment immediately after the start of the seek control of FIGS. 2A to 2C, an acceleration control is provided. This acceleration control provides a predetermined acceleration $A_0$ during the time $T_0$. As a result, the velocity reaches $V_D$ and the position reaches $X_0$. For that duration, the switch 310 is opened to shut out the velocity feedback signal. In the deceleration control segment which follows, an initial value $A_1$ of the target acceleration is derived from the expression (2) so as to achieve the velocity $V_C$ after the time $T_1$ on the basis of the velocity $V_D$ detected upon the changeover, and then a target acceleration signal $A(t)$ and a target velocity signal $V(t)$ corresponding to the elapsed time are derived from the expressions (1) and (3), respectively. At that time, the switch 310 is closed to provide a velocity feedback control for the elapsed time of the decelerated acceleration control. After the elapse of the time $T_1$, the velocity $V(t)$ reaches a velocity $V_C$, with the acceleration of zero and the position $X_1$. Herein, the velocity $V_C$ is enough a low velocity to allow a migration to the track following control, and the velocity feedback control allows a selection of enough a feasible velocity. For example, in case of a 3.5 inch 1.3 GB magneto-optical disk of 0.9 $\mu$m track pitch, $V_C=7$ mm/s would ensure a velocity control band of the order of 500 Hz to 1 KHz since the TES zero-cross signal TZCS has a frequency of 7.8 KHz which is used as a sampling frequency of the seek control system. After the elapse of time $T_1$, the actuator is velocity controlled at the constant target velocity $V_C$, with the position being increased from $X_1$ linearly with respect to the time. Assume now that the position upon the migration to the track following control is for example $X_2$ which is the position precedent one track to the target track. Then, the instant that detection has been made of the arrival of the actuator at the position $X_2$ after the elapse of the time $T_{C1}$, a migration is carried out to the track following control. The time $T_E$ upon the migration to the track following control is given by $$T_E = T_0 + T_1 + T_{C1} \qquad (4)$$

A track lead-in time not shown is added to this period of time till the time $T_E$ to obtain a total seek time. In case of such a provision of the seek control generating the decelerated acceleration and decelerated velocity target trajectories based on the elapsed time, the time $(T_0+T_1)$ till the termination of the deceleration control is unvarying irrespective of the increase in the distance to the target track, but the time $T_{C1}$ of the constant-velocity control will vary depending on the seek distance. Thus, accordingly as the seek distance increases, the time $T_{C1}$ of the constant-velocity control will also be increased, resulting in a longer time taken to reach the target track in proportion to the seek distance. To attenuate this drawback, the target velocity $V_C$ in the constant-velocity control may be increased. However, too a high velocity may possibly impair the stability of migration to the track following control.

SUMMARY OF THE INVENTION

According to the present invention there is provided a storage device providing a seek control so as to reduce the seek time while securing the enough stability of migration to the track following control.

The present invention is directed to the storage device providing a seek control for moving a head moving mechanism in a track crossing direction of a medium (or disk) through a drive of an actuator to position the head moving mechanism at a target track. According to a first aspect of the present invention, the storage device comprises a seek control unit which divides a seek control section into four segments, i.e., an acceleration control segment, a maximum constant-velocity control segment, a deceleration control segment and a minimum constant-velocity control segment, the seek control unit providing a control of the four control segments depending on the elapsed time from the start of seek; and a time tuning unit which tunes the time of the maximum constant-velocity control segment into the optimum time for shortening the time of the minimum constant-velocity control, the time tuning unit setting the tuned time for the maximum constant-velocity control segment. That is, in the present invention there is newly provided the maximum constant-velocity control segment in which the maximum velocity after acceleration remains kept till the migration to the deceleration control from the termination of the acceleration control. The duration of this maximum constant-velocity control segment is tuned and set so as to always allow the time of the minimum constant-velocity control segment at the minimum velocity after the termination of the deceleration control to have the minimum length, relative to the variances of the seek distance up to the target track. For this reason, irrespectively of a longer seek distance, it is possible to set the optimum maximum constant-velocity control time $T_{C2}$ depending on the distance to the target track and thus to shorten the seek time while securing the stability of migration to the track following control from the seek control.

The time tuning unit makes such a tuning as to allow the sum $(T_{C2}+T_{ofst})$ of the optimum time $T_{C2}$ of the maximum constant-velocity control segment and a predetermined offset time $T_{ofst}$ to be proportional to a distance $(X_2-X_{ofst})$ when subtracting a predetermined offset distance $X_{ofst}$ from a seek distance $X_2$ but inversely proportional to a target maximum velocity $V_D$. In such a case, use of a fixed value for example as the target maximum velocity $V_D$ enables the optimum maximum constant-velocity control time $T_{C2}$ to be set relative to the variances of the seek distance $X_2$ by figuring out upon the seek control the optimum time $T_{C2}$ relative to the variances of the seek distance $X_2$ to the target track or by a previous provision in the form of a table. The time tuning unit uses as the time of the maximum constant-velocity control segment a tuned time obtained as a result of reduction of the optimum time $T_{C2}$ by addition of a desired margin in the form of increase of the offset time $T_{ofst}$, the optimum time $T_{C2}$ being determined from the seek distance $X_2$ and the target maximum velocity $V_D$. For this reason, the maximum constant-velocity control time for use in the actual seek control is set as a somewhat shortened time relative to the ideal time $T_{C2}$, thereby obviating such a situation that stable migration to the track following control may become infeasible since the target track is passed through in the course of the next deceleration control segment because of too long a maximum constant-velocity control time. The seek control unit includes an acceleration control unit which provides an acceleration control of the actuator by a predetermined target acceleration $A_0$ in the acceleration control segment; a maximum constant-velocity control unit which provides a constant-velocity control of the actuator so as to allow a maximum velocity $V_D$ upon the termination of the acceleration control to be kept as a target velocity; a decelerated acceleration trajectory control unit which in the deceleration segment, generates based on the elapsed time a target decelerated acceleration trajectory for deceleration within a predetermined time to a predetermined minimum velocity $V_C$ which allows a migration to a track following control with a predetermined decelerated acceleration $A_1$ as its initial value, to thereby provide a deceleration control of the actuator; a velocity trajectory control unit which in the deceleration control segment, generates based on the elapsed time a target velocity trajectory which lowers depending on the target decelerated acceleration trajectory with the maximum velocity $V_D$ as its initial value, to thereby provide a velocity control of the actuator; and a minimum constant-velocity control unit which provides a constant-velocity control of the actuator in the minimum constant-velocity control segment till the start of a track following control immediately precedent to a target track, with the minimum velocity $V_C$ as its target velocity. The storage device of the present invention further comprises a velocity feedback control unit and an acceleration feedforward control unit. The velocity feedback control unit includes a position detector detecting the radial position of a head from a tracking error signal, a velocity detector detecting the velocity of the head in the track crossing direction from the tracking error signal, and a target velocity generator generating a target velocity signal based on the elapsed time. The velocity feedback control unit generates a velocity feedback signal from a velocity error between the target velocity and the head velocity to thereby provide a control of the head moving mechanism. The acceleration feedforward control unit includes a target acceleration generator generating a target acceleration signal based on the elapsed time. The acceleration feedforward control unit issues for acceleration control the target acceleration signal as an acceleration feedforward signal to the head moving mechanism. The maximum constant-velocity control unit and the minimum constant-velocity control unit are incorporated in the velocity feedback control unit, the acceleration control unit and the deceleration control unit being incorporated in the acceleration feedforward control unit. The velocity feedback signal is added via a switch to the acceleration feedforward signal, the resultant signal being fed as a seek control signal to the head moving mechanism, the switch being turned off in the acceleration control segment, the switch turned on in the maximum constant-velocity control segment, the deceleration control segment and minimum constant-velocity control segment. This allows a combined control of the target acceleration trajectory control unit and the target velocity trajectory control unit to be provided in the deceleration control segment whereby a high follow-up performance is assured for the deceleration control target value. The scheduler may make a changeover from the acceleration control segment to the maximum constant-velocity control segment upon the movement through a predetermined distance from the start of seek control. The changeover at the start of seek control from the acceleration control segment to the maximum constant-velocity control segment in the present invention is based in principle on the elapsed time, although the changeover may be made based on the time of movement from the start of seek, more specifically based on the number of tracks which has been passed through. In this case, the acceleration time cannot unitarily be determined and hence the maximum velocity upon the changeover is detected and set as the target velocity in the next maximum constant-velocity control.

The head for use in the storage device of the present invention is moved in a radial direction of the medium with an optical pickup optically detecting information of record tracks on the medium or with a magnetic pickup magnetically detecting the same, the optical or magnetic pickup being mounted on the actuator.

According to a second aspect of the present invention there is provided a seek control method for a storage device in which a head moving mechanism is moved in a track crossing direction of a medium through a drive of an actuator so that the head moving mechanism is positioned at a target track. The seek control method comprises a control step which includes dividing a seek control section into four segments, i.e., an acceleration control segment, a maximum constant-velocity control segment, a deceleration control segment and a minimum constant-velocity control segment, to provide a control of the four control segments depending on the elapsed time from the start of seek; and a time tuning step which includes tuning the time of the maximum constant-velocity control segment into the optimum time for shortening the time of the minimum constant-velocity control, to set the tuned time for the maximum constant-velocity control segment. The details of this seek control method are substantially the same as those of the apparatus configurations.

The above and other objects, aspects, features and advantages of the present invention will become more apparent from the following detailed description when read in conjunction with the accompanying drawings.

BRIEF DESCRIPTION OF THE DRAWINGS

FIG. 6 is an explanatory diagram of an optical system of the optical disk apparatus;

FIGS. 9A to 9D are time charts of the velocity, acceleration, position and segment based on the seek control of the present invention.

DETAILED DESCRIPTION OF THE PREFERRED EMBODIMENT

Figure 3A:
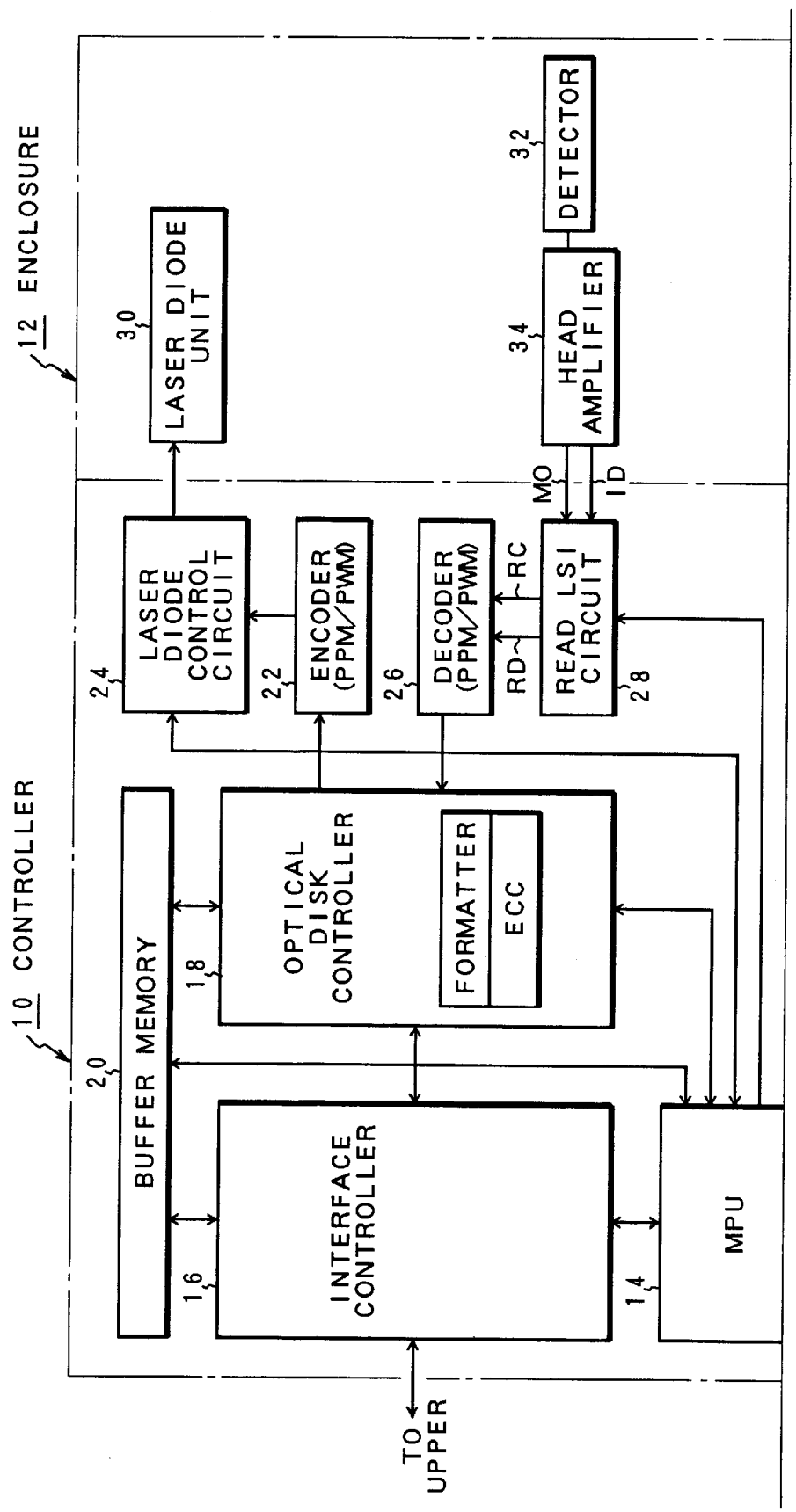
FIGS. 3A and 3B are block diagrams of the apparatus configuration of an optical disk apparatus by way of example.
Figure 3B:
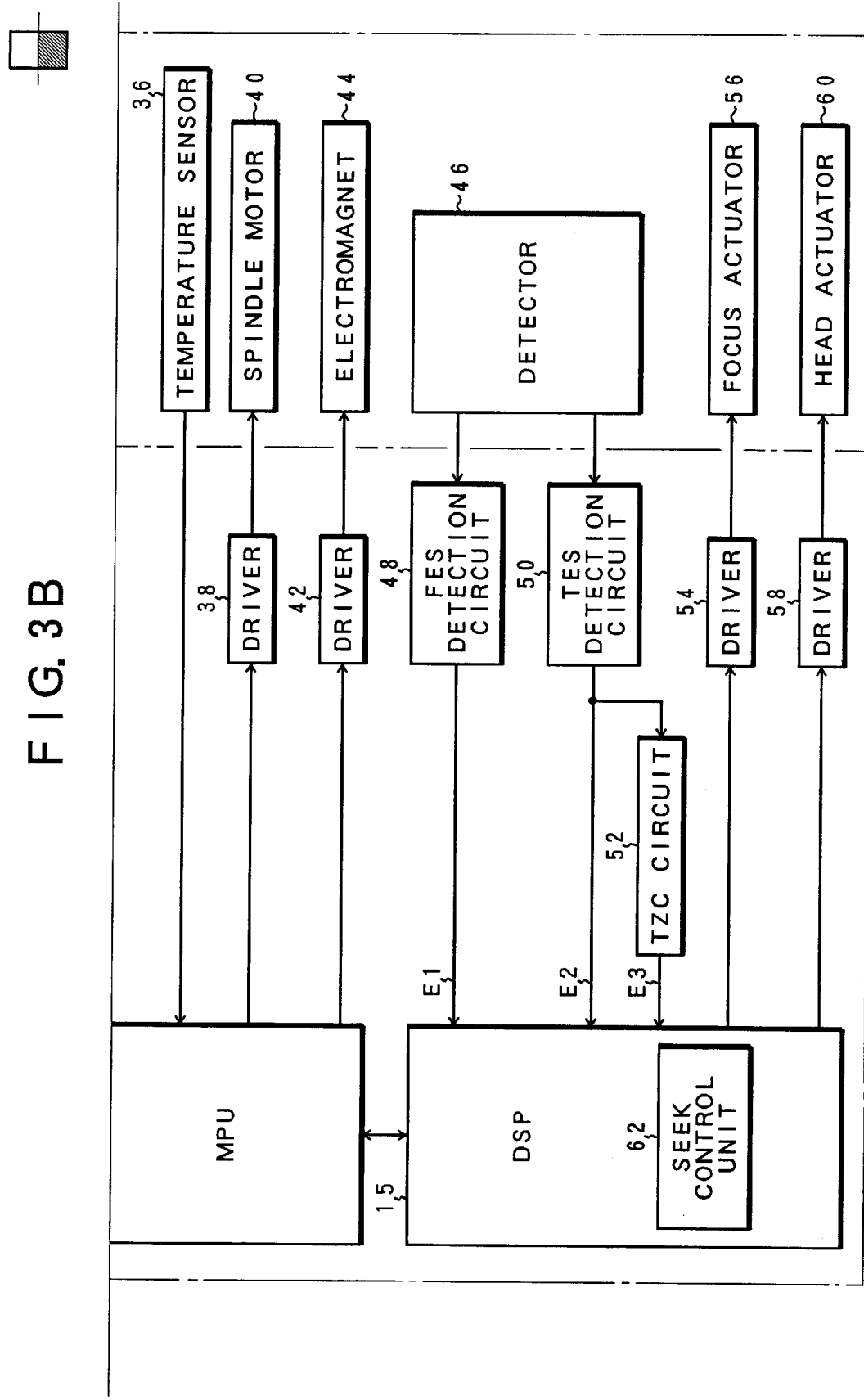

FIGS. 3A and 3B are block diagrams showing the apparatus configuration of a magneto-optical disk apparatus making access to a magneto-optical disk, the magneto-optical disk apparatus being a storage device to which is applied a seek control of the present invention. The magneto-optical disk can be for example a phase-change (PD) type magneto-optical disk or a magneto-optical (MO) disk. A typical optical disk apparatus is therein taken by way of example which makes access to the magneto-optical disk. An optical disk drive employing the seek control of the present invention is constructed from a controller 10 and an enclosure 12. The controller 10 is provided with an MPU 14 providing an entire control, an interface controller 16 interchanging commands or data with a host, an optical disk controller (ODC) 18 effecting a formatter or ECC required for data read from and write to the magneto-optical disk, and a buffer memory 20. The optical disk controller 18 is associated with a write system consisting of an encoder 22, a laser diode control circuit 24 and a laser diode unit 30. The optical disk controller 18 is associated with a read system consisting of a decoder 26 and a read LSI circuit 28. The read LSI circuit 28 accepts via a head amplifier 34 light-reception signals of a return light from the magneto-optical disk detected by a detector 32 of the enclosure 12, in the form of an ID signal and an MO signal. The read LSI circuit 28 generates a read clock and read data from the input ID signal and MO signal, for the output to a decoder 26. The MPU 14 accepts a detection signal from a temperature sensor 36 included in the enclosure 12. On the basis of the environmental temperature within the apparatus sensed by the temperature sensor 36, the MPU 14 provides an optimum value control of light-emission powers of the read, write and erase in the laser diode control circuit 24. The MPU 14 further provides a control of a spindle motor 40 by way of a driver 38. The MPU 14 further provides a control of an electromagnet 44 by way of a driver 42. The electromagnet 44 provides an external magnetic field upon the record and erase, and upon the regeneration in case of the ultra-resolution magneto-optical system optical disk medium. A DSP 15 moves a head moving mechanism (light pickup) mounted with an objective lens in the disk radial direction and provides a control positioning the laser beam at a target track. This positioning control consists of a seek control for moving the head moving mechanism to the target track and of a track following control for leading in the head moving mechanism toward the target track and allowing it to follow the target track when coming closer to the target track. To provide the head moving mechanism positioning control, the enclosure 12 is provided with a multi-division photo-detector 46 for receiving a return light from the medium. An output from the multi-division photo-detector 46 is fed to an FES detection circuit (focus error signal detection circuit) to generate a focus error signal E1 for the input to the DSP 15. The output from the multi-division photo-detector 46 is also fed to a TES detection circuit (tracking error signal detection circuit) 50 to generate a tracking error signal E2 for the input to the DSP 15. The tracking error signal E2 is fed to a TZC circuit (TES zero-cross detection circuit) 52 to generate a TES zero-cross pulse E3 for the input to the DSP 15. To effect the beam positioning by the head moving mechanism, the DSP 15 drives, via drivers 54 and 58, a focus actuator 56 and a head actuator (VCM) 60 which drives the head moving mechanism. The DSP 15 has a function of a seek control unit 62. The seek control unit 62 drives the head actuator 60 in order to move the head moving mechanism to a target track specified by an access command from the host. The seek control unit 62 of the present invention provides a velocity feedback control and an acceleration feedforward control by the occurrence of the target velocity and target acceleration based on the elapsed time from the seek start. Herein, the seek control of the present invention includes, e.g., three different seek controls depending on the seek distance up to the target track. In this case, the optical disk medium is a 1.3 GB medium of 3.5 inch disk cartridge. In the case of the track pitch of 0.9 μm for example, the seek control is classified into three seeks which follow.

(I) very short seek having the seek distance of 1 to 9 tracks;

(II) short seek having the seek distance of 10 to 50 tracks; and (III) long seek having the seek distance over 50 tracks.

In the very short seek having the seek distance of 1 to 9 tracks, an open control is fundamental which determines the acceleration and deceleration pulse shapes, although another method is also feasible which detects a crossing 0.5 track signal (a groove between the recording tracks) in the halfway to regulate the pulse height and width timings. For several tracks between the acceleration pulse and the deceleration pulse, a velocity feedback control may be applied based on one-track crossing time. In case of the long seek exceeding 50 tracks, the acceleration control is provided until reaching the target velocity function (or table) with a velocity control trajectory based on the remaining distance. After reaching the target velocity, the deceleration control is provided in accordance with the target velocity trajectory. Alternatively there also exists a target velocity trajectory allowing the maximum constant-velocity control previous to the full acceleration control. In contrast with this, the present invention is directed to the short seek having a relatively short seek distance of the order of 10 to 50 tracks. In the short seek targeted by the present invention, no use is made of the position signals as used in the prior art, but instead the target velocity signal and the target acceleration signal based on the elapsed time from the seek start are generated to move the head moving mechanism to the target track. More specifically, the seek control section in the short seek is divided into four segments, i.e., an acceleration control segment, a maximum constant-velocity control segment where is kept the maximum velocity upon the termination of acceleration, a deceleration control segment where deceleration is effected to the minimum velocity required for the track following control, and a minimum constant-velocity control segment where is kept minimum velocity allowing a migration to the track following control after the termination of deceleration. The details will be described later of the seek control unit 62 for use in the short seek of the present invention.

Figure 4:
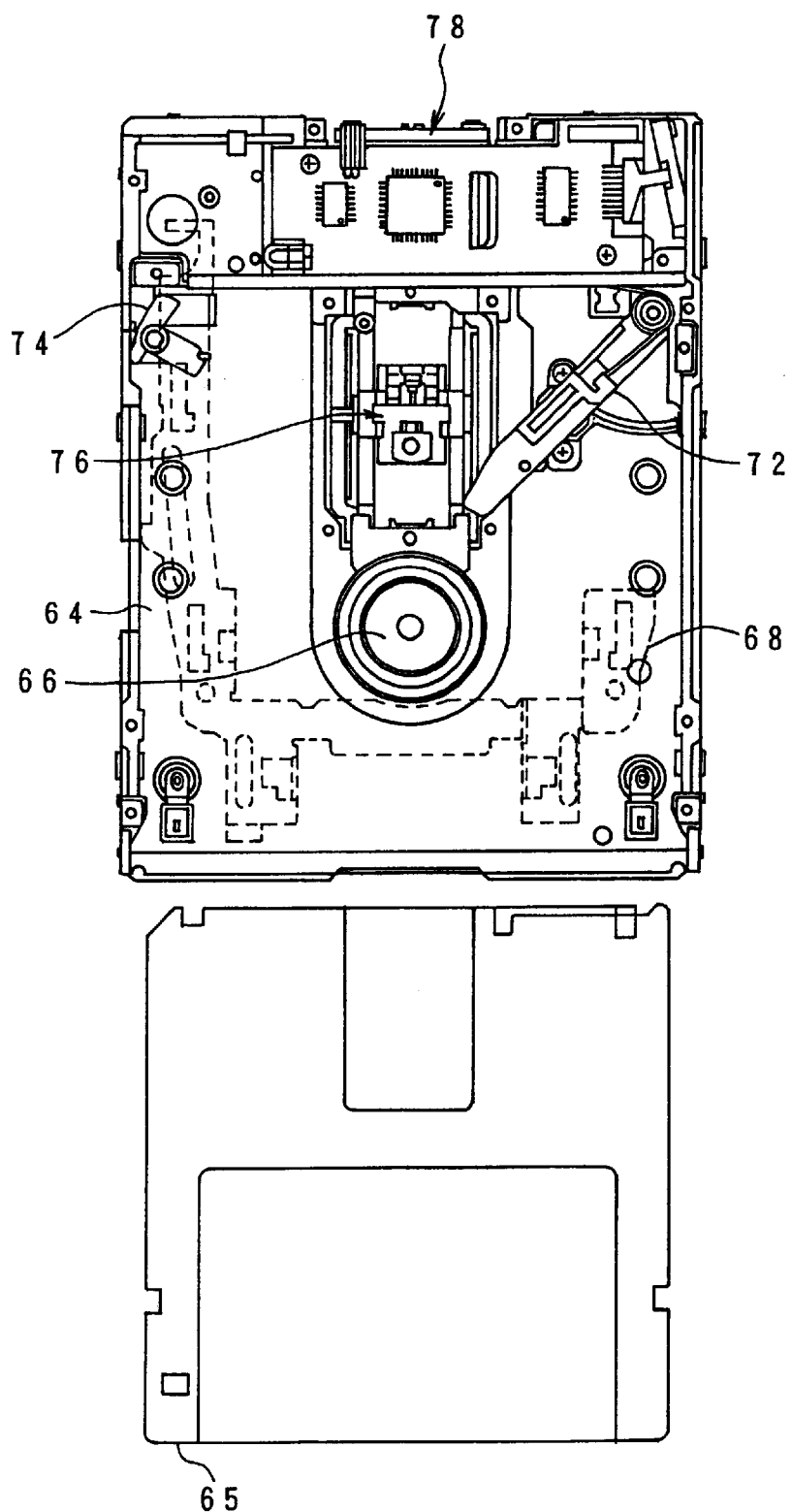
FIG. 4 is an explanatory diagram of the internal structure of the optical disk apparatus.

FIG. 4 is an explanatory diagram of the internal structure of the optical disk drive of the present invention employing the controller 10 and the enclosure 12 of FIGS. 3A and 3B. The optical disk drive comprises a base 64 on which is placed a turntable 66 that is rotated by a spindle motor. At the cartridge inlet below, the optical disk drive is provided with a load plate 68 indicated by a dotted line. The optical disk drive has a rotatable eject arm 72 disposed on the far side of the base 64 and has, on the opposite side thereto, a timing pin 74 for positioning and locking an optical disk cartridge 65 upon the insertion thereof. A head moving mechanism 76 is disposed on far side of the turn table 66. The head moving mechanism provides a moving optical system in the optical pickup. A fixed optical system 78 is incorporated at a rear position confronting the head moving mechanism 76. By inserting the optical disk cartridge 65 through the opening at the bottom of the base 64 of such an optical disk drive, the optical disk cartridge 65 abuts on its left far side against the timing pin 74 by the action of the load plate 68 and is inserted into the rotationally locked position. At that time, the eject arm 72 is pushed and rotated in the counterclockwise by the extremity of the optical disk cartridge 65, and becomes horizontal in the state shown. Upon the ejection, the eject arm is restored to its original position, allowing the optical disk cartridge 65 to be discharged to the exterior.

Figure 5:
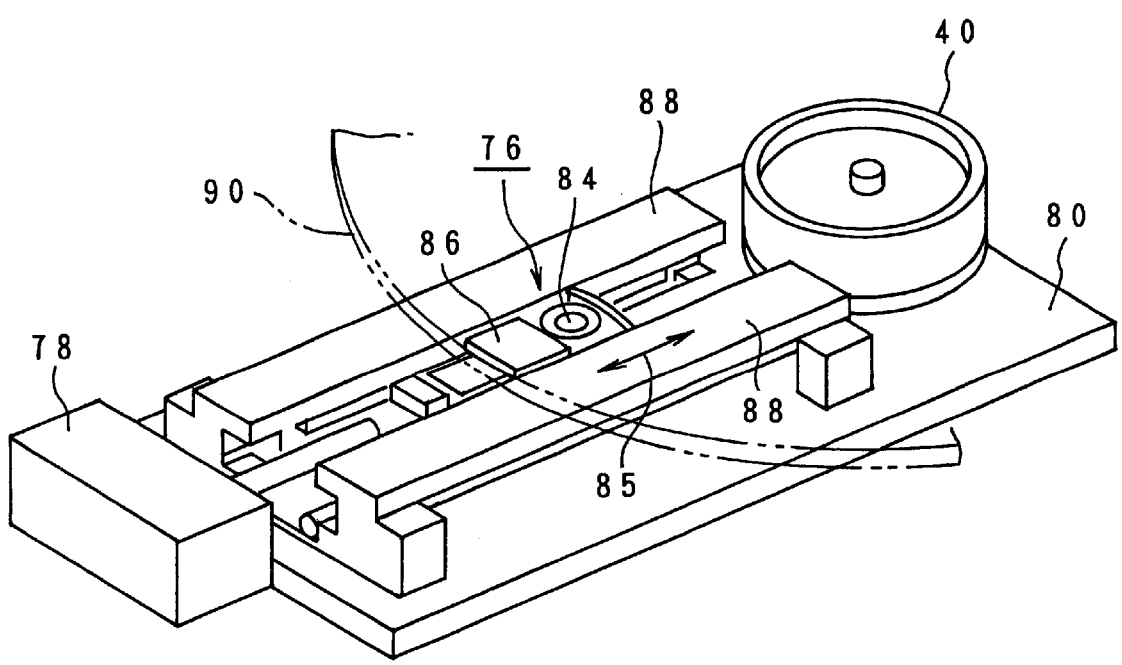
FIG. 5 is an explanatory diagram of a head mechanism of the optical disk apparatus.

FIG. 5 is an explanatory diagram of the head moving mechanism 76 of FIG. 4, depicted together with the fixed optical system 78. The spindle motor 40 is fixedly mounted on a drive base 80, for rotationally driving an optical disk 90. Disposed on the drive base 80 are the head moving mechanism 76 provided with an objective lens 84 and an electromagnetic coil 86, and a pair of permanent magnet 88 arranged so as to sandwich the head moving mechanism 76. A magnetic circuit having an electromagnetic coil 86 and a permanent magnet 88 provides a VCM (voice coil motor) such that when the electromagnetic coil 86 is fed with a current, mutual action between the current and the magnetic circuit moves the head moving mechanism 76 toward the direction indicated by an arrow 85. The objective lens 84 accepts a laser beam from the fixed optical system 78, the laser beam being output from the objective lens 84 so that a light spot impinges on the magneto-optical disk 90, a reflected light therefrom returning to the fixed optical system 78 again through the objective lens 84 to pick up the information recorded on the magneto-optical disk 90.

FIG. 6 is an explanatory diagram of the optical system in the optical disk drive. The laser beam output from a semiconductor laser 94 passes through a collimator lens 96 and further through a polarization beam splitter 98. The laser beam is then reflected on a reflection mirror 92 and, through the objective lens 84, condensed on the magneto-optical disk 90. Herein, the objective lens 84 and the reflection mirror 92 are mounted on the head moving mechanism 76, with all the other optical elements being incorporated in the fixed optical system 78. A signal light containing record information reflected on the magneto-optical disk 90 is reflected on the reflection mirror 92 by way of the objective lens 84, and then impinges on the polarization beam splitter 98 and is finally output toward the beam splitter 100. The incident light into the beam splitter 100 is split into two beams, one of which passes through Wollaston prism 102 for the separation depending on the direction of polarization, and further through a lens 104 for the input to an optical detector 106 for picking up the information recorded on the magneto-optical disk 90. The other of the two beams obtained through the beam splitter 100 passes through an output lens 108 and impinges on a beam splitter 110 for further splitting into two beams, one of which strikes on an optical detector 112 for tracking error detection, the other of which passes through a wedge prism 114 for the splitting into two beams, which in turn impinge on an optical detector 116 for focus error detection. It is to be noted that the optical detector for tracking error detection and the optical detector for focus error detection are implemented by the multi-division photodetector 46 included in the enclosure 12 of FIGS. 3A and 3B.

Figure 7:
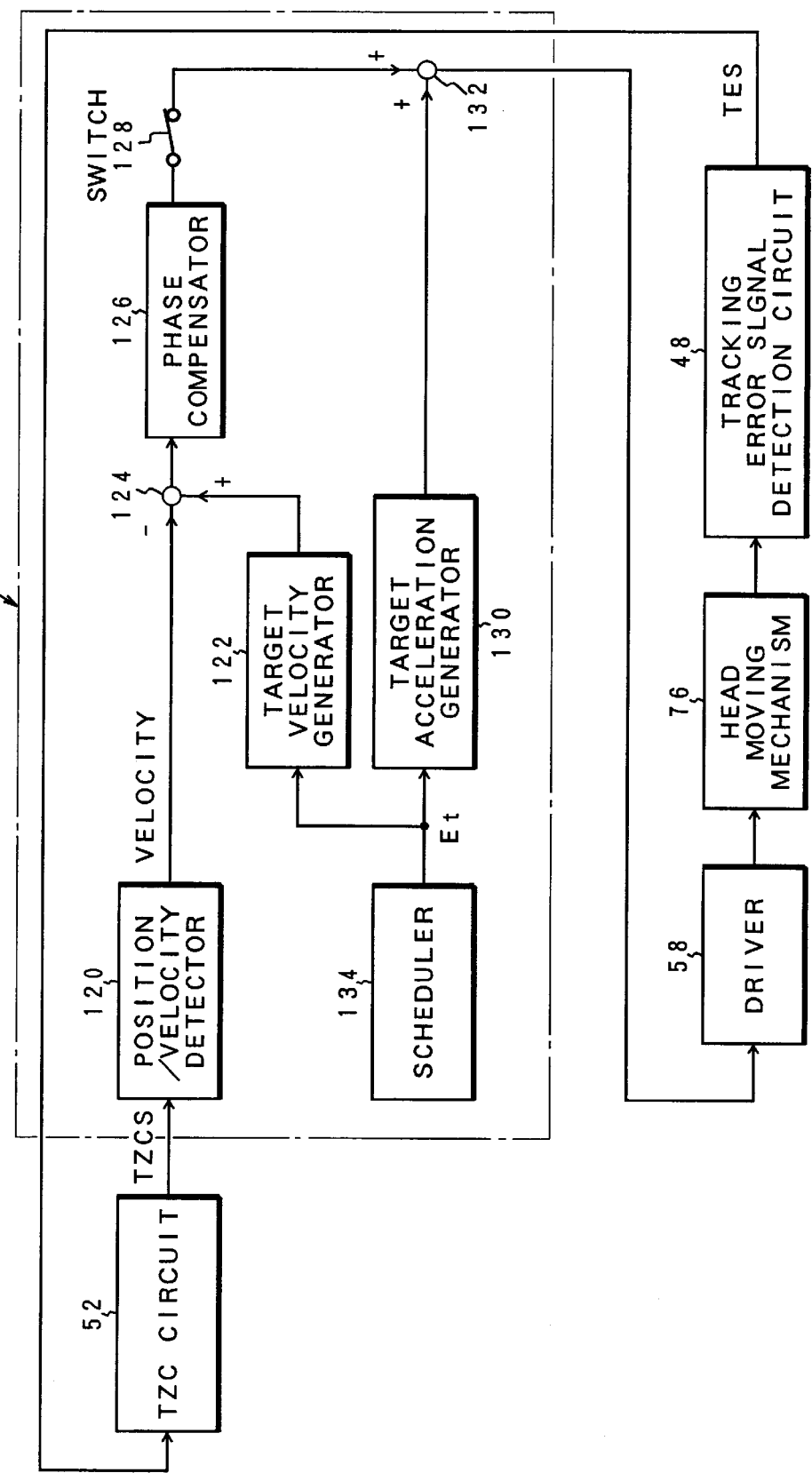
FIG. 7 is a block diagram of the functional configuration of a seek control unit in accordance with the present invention.

FIG. 7 is a block diagram of the functional configuration for short seek effected by the seek control unit of the present invention implemented as a function of the DSP 15 of FIGS. 3A and 3B. The DSP 15 is provided with functions of a position/velocity detector 120, an target velocity generator 122, an addition point 124, a phase compensator 126, a switch 128, an target acceleration generator 130, an addition point 132 and a scheduler 134. The exterior of the DSP 15 is provided with a tracking error signal detection circuit 48, the TZC circuit 52, the driver 58 and the head moving mechanism 76. The block of the DSP 15 provides a velocity feedback control unit and an acceleration feedforward control unit. The velocity feedback control unit is formed from the position/velocity detector 120, the target velocity generator 122, the addition point 124 and the phase compensator 126. The acceleration feedforward control unit is formed from the target acceleration generator 130. A velocity feedback signal from the phase compensator 126 is added at the addition point 132 via the switch 128 to an acceleration feedforward signal from the target acceleration generator 130, with the resultant output of the addition point 132 driving as a seek control signal the head moving mechanism 76 by way of the driver 58, to provide a seek control for moving the objective lens to the radial direction of the magneto-optical disk. The target velocity generator 122 and the target acceleration generator 130 of the DSP 15 generate a target velocity signal and a target acceleration signal on the basis of a time signal Et indicative of the elapsed time from the seek start output from the scheduler 134. Thus, because of no dependence on the position signal of the occurrence of the target velocity and the target acceleration in the seek control of the present invention, the influence of the noises can be minimized even in the case of control easily influenced by noises which does not have so high seek velocity in the acceleration control due to short seek distance of the order of 10 to 50 tracks. The scheduler 134 divides the seek control section into four segments, i.e., an acceleration control segment, a maximum constant-velocity control segment, a deceleration control segment and a minimum constant-velocity control segment, to generate the target velocity and the target acceleration depending on the elapsed time.

Figure 8:
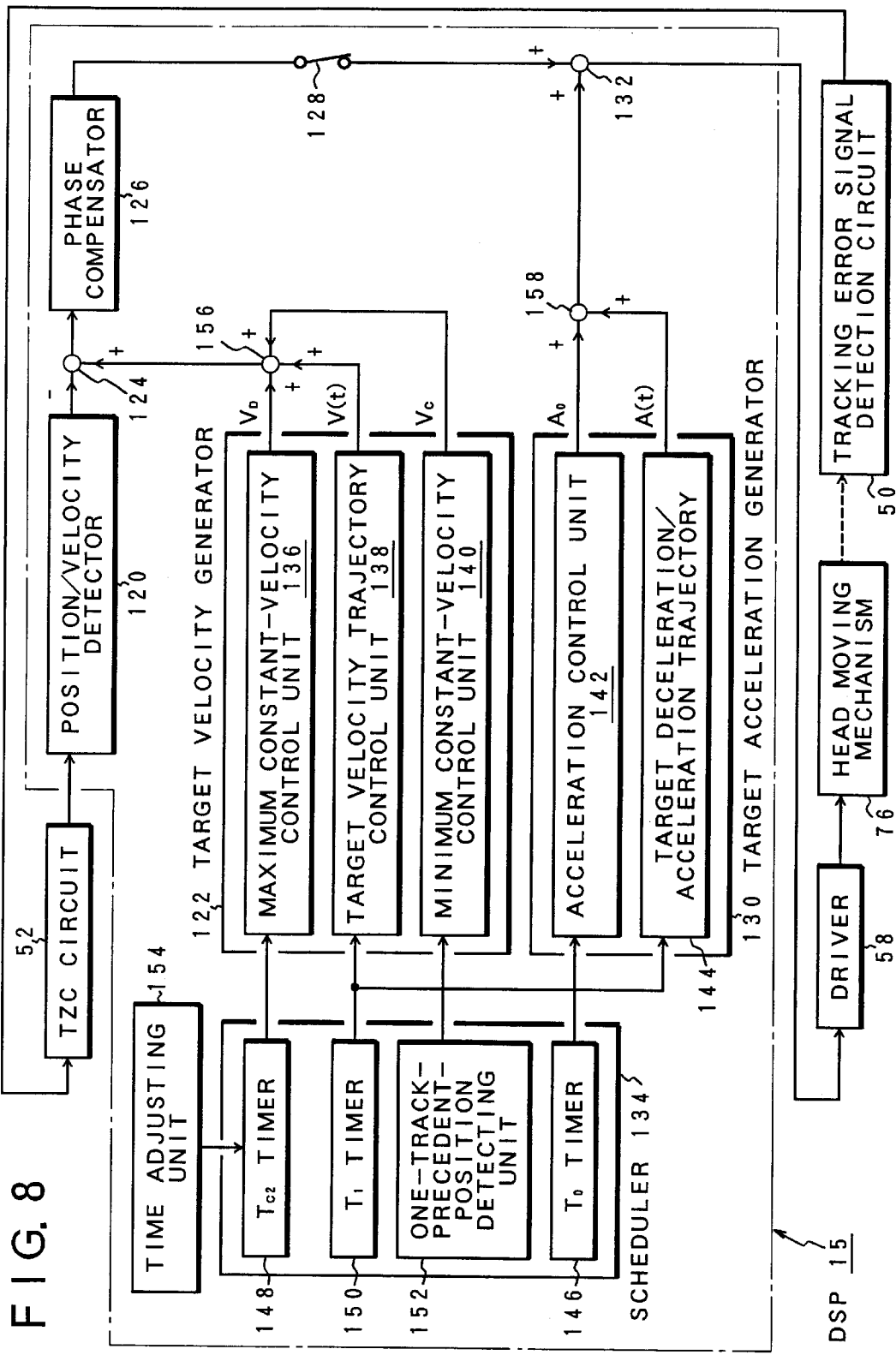
FIG. 8 is a block diagram of the detailed configuration of the seek control unit of FIG. 7.

FIG. 8 shows the details of the functions of the scheduler 134, the target velocity generator 122 and the target acceleration generator 130 provided in the DSP 15 of FIG. 7. The target velocity generator 122 includes a maximum constant-velocity control unit 136, a decelerated velocity trajectory control unit 138 and a minimum constant-velocity control unit 140. The target acceleration generator 130 includes an acceleration control unit 142 and a decelerated acceleration trajectory control unit 144. Correspondingly to the control functions of the target velocity generator 122 and the target acceleration generator 130, the scheduler is provided with a $T_0$ timer 146 determining the time $T_o$ in the acceleration control segment, a $T_{C2}$ timer 148 determining the time $T_{C2}$ in the maximum constant-velocity control segment, a $T_1$ timer 150 determining the time $T_1$ for the target velocity trajectory control and the target decelerated acceleration trajectory control in the deceleration control segment, and a one-track-precedent-position detection unit 152 detecting the one-track-precedent position of target track. The $T_{C2}$ timer 148 determining the time $T_{C2}$ in the maximum constant-velocity control segment is associated with a time tuning unit 154 for adjusting and setting the optimum time. The following are the functions of the control units implemented in case of dividing the seek control section into the acceleration control segment, the maximum constant-velocity control segment, the deceleration control segment, the minimum constant-velocity control segment. First, the acceleration control unit 142 of the target acceleration generator 130 operated in the acceleration control segment allows a certain target acceleration $A_0$ which has been previously defined at the start of the seek control to be generated for a predetermined time $T_0$, to thereby provide an acceleration control of the head moving mechanism 76. The maximum constant-velocity control unit 136 of the target velocity generator 122 operated in the maximum constant-velocity control segment provides a constant-velocity control of the head moving mechanism such that the maximum velocity $V_D$ at the termination of the acceleration control is kept as the target velocity for the duration $T_{C2}$. In the next deceleration control segment, both the decelerated velocity trajectory control unit 138 and the decelerated acceleration trajectory control unit 144 are put in action. With a predetermined decelerated acceleration $A_1$ as its initial value, the decelerated acceleration trajectory control unit 144 generates a target decelerated acceleration trajectory A(t) for achieving a deceleration within a predetermined time $T_1$ to a predetermined, constant minimum velocity $V_C$ which allows a migration to the track following control, as the initial value, to thereby provide a deceleration control of the head moving mechanism 76 based on the acceleration feedforward control. Using as its initial value the maximum velocity $V_D$ in the immediately precedent maximum constant-velocity control segment, the decelerated velocity trajectory control unit 138 simultaneously operated in this deceleration control segment generates based on the elapsed time a target trajectory velocity V(t) which reduces in compliance with the target decelerated acceleration trajectory A(t), to thereby provide a velocity feedback control of the head moving mechanism 76. That is, the switch 128 is closed in the deceleration control segment such that a velocity feedback signal from the phase compensator 126 and an acceleration feedforward signal from the target acceleration generator 130 are added together at the addition point 132, the result of the addition being fed as a seek control signal from the driver 58 to the head moving mechanism 76, to thereby achieve a deceleration control based on the combined acceleration feedforward control and velocity feedback control. Using as the target velocity a predetermined, constant minimum velocity $V_C$ which allows a migration to the track following control, the minimum constant-velocity control unit 140 operated in the last minimum constant-velocity control segment provides a velocity feedback control of the head moving mechanism 76 based on the velocity feedback control till the start of the track following control at a position immediately previous, e.g., one-track precedent to the target track.

Figure 1:
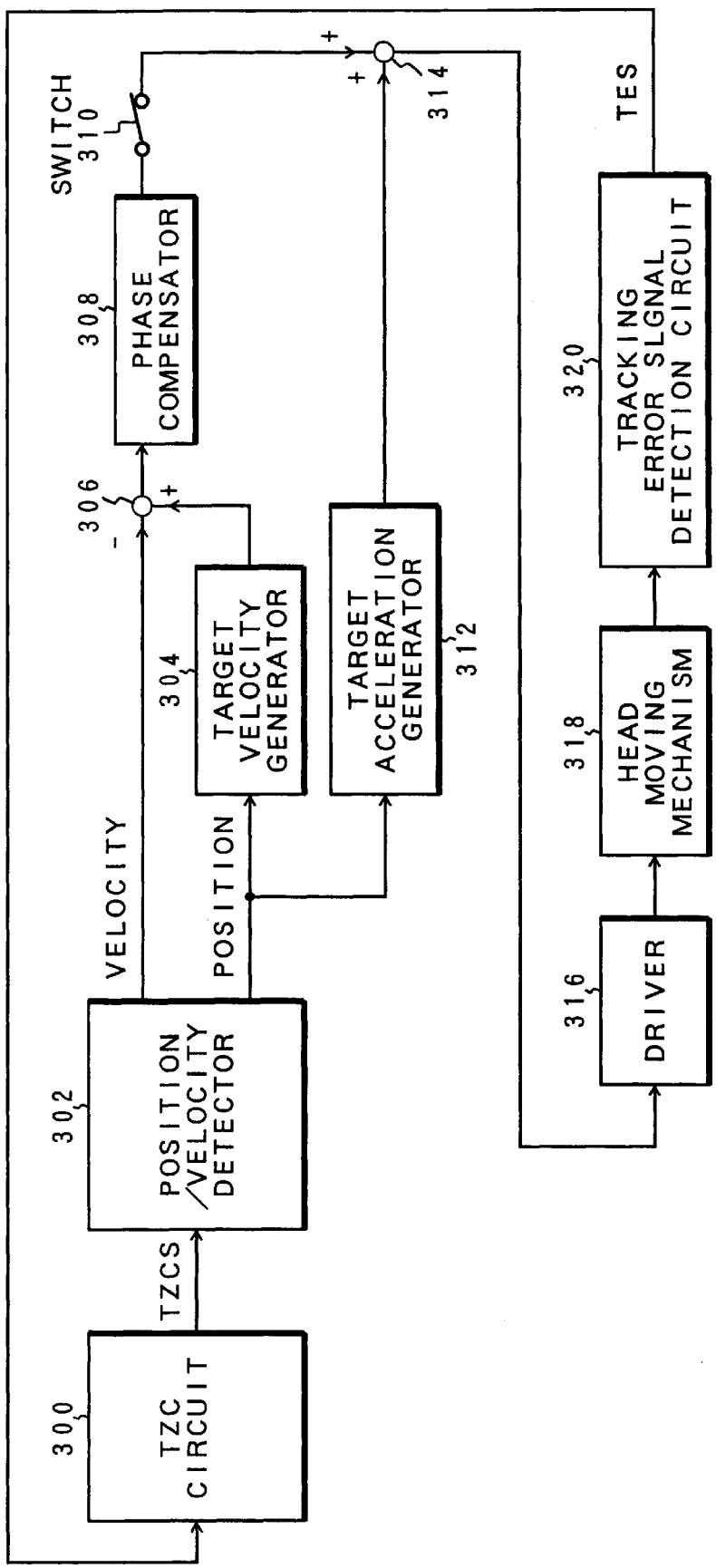
FIG. 1 is a block diagram of a conventional seek control unit providing a control depending on a position entry.
Figure 2A:
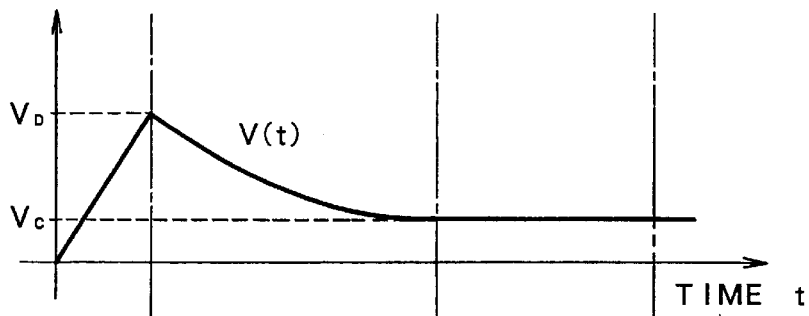
FIGS. 2A–2C are time charts of a seek control based on the time entry having no maximum constant-velocity segment, which is a comparative example of the present invention.
Figure 2B:
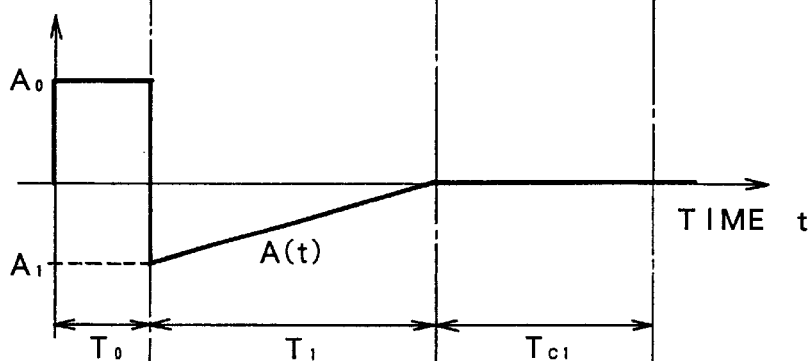
Figure 2C:
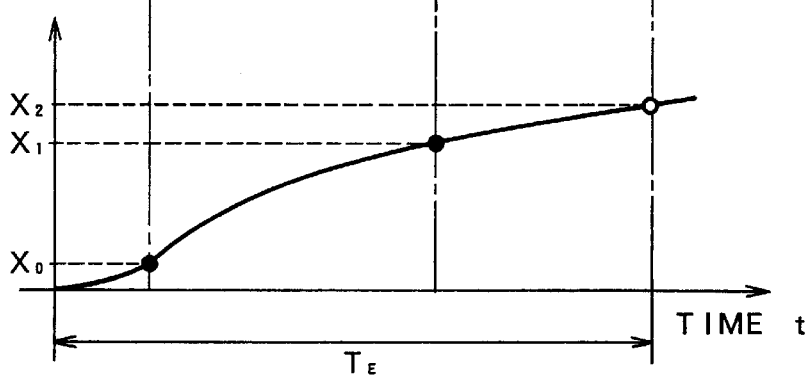

In the seek control of the comparative example of FIGS. 2A to 2C considered by the present inventors, the seek control section was divided into three segments, i.e., the acceleration control segment, the deceleration control segment and the minimum constant-velocity control segment, whereas in the present invention the maximum constant-velocity control segment intervenes between the acceleration control segment and the deceleration control segment so as to minimize the duration of the minimum constant-velocity segment keeping the minimum velocity $V_C$ which allows a migration to the track following control, to thereby enable the seek time to be shortened irrespective of the increase of the seek distance. In order to optimize the time $T_{C2}$ of the newly provided maximum constant-velocity control segment enabling the seek time to be shortened relative to this seek distance, the time tuning unit 154 is provided. For the setting into a $T_{C2}$ timer, the time tuning unit 154 serves to adjust the time $T_{C2}$ of the maximum constant-velocity control segment so as to minimize the time $T_{C1}$ of the minimum constant-velocity control segment. The optimum time $T_{C2}$ is adjusted to be the optimum time which is proportional to the seek distance but inversely proportional to the target maximum velocity $V_D$. Without intactly setting into the $T_{C2}$ timer 148 the optimum time $T_{C2}$ of the maximum constant-velocity control segment which is proportional to the seek distance but inversely proportional to the target maximum velocity $V_D$, the time tuning unit 154 multiplies the thus obtained optimum time with a coefficient not more than 1 to thereby set into the $T_{C2}$ timer an adjusted time having a certain margin added thereto. By virtue of this, it is possible to prevent in advance a passage through the target track previous to the deceleration to the minimum velocity $V_C$ which allows the migration to the track following control due to the variations in the control conditions such as disturbances.

FIGS. 9A to 9D are time charts of the seek control effected in case of application of the present invention. That is, FIG. 9A depicts the velocity of the head moving mechanism 76, FIG. 9B depicts the acceleration thereof, FIG. 9C depicts the position thereof, and FIG. 9D depicts the intervals of the seek control sections. All the axes of abscissas represent the time t. The velocity, acceleration and position in the comparative example of FIGS. 3A to 3C are indicated thereon by dotted lines in a superposed manner. First, an acceleration control segment 160 is set at the start of seek so that the acceleration control is provided during the time $T_0$ from the time t0 to t1. In this case, the predetermined acceleration $A_0$ is output during the time $T_0$ so that the velocity reaches $V_D$ with the arrival at the position $X_0$ of a point P1. For the duration, the switch 128 is opened so as to provide a feedforward control which issues an acceleration $A_0$ as its target acceleration, with the velocity feedback control turned off. Upon the termination of the acceleration control at the time t1, the switch 128 is closed so that, using as the maximum velocity the velocity $V_D$ detected at that time, the target velocity generator 122 issues the maximum velocity $V_D$ in the form of a target velocity signal for the duration $T_{C2}$ from the time t1 to t2 adjusted to the optimum time. Herein, the maximum velocity $V_D$ is given as $$V_D = A_0 T_0 \qquad (5)$$

At that time, output from the target acceleration generator 130 is zero. The target velocity signal of the maximum velocity $V_D$ issued from the target velocity generator 122 is fed from the addition point 156 to the addition point 124 to obtain a velocity error signal relative to the velocity signal currently output from the position/velocity detector 120, the resultant velocity error signal being fed to the phase compensator 126 for the gain and phase compensation, after which it is output as a velocity feedback signal. The switch 128 is closed at that time and the output of the target acceleration generator 130 is zero, with the result that the velocity feedback signal is fed as a seek control signal through the addition point 132 to the head moving mechanism 76 so as to provide a constant-velocity control to keep the maximum velocity $V_D$. The position of the head moving mechanism 76 after the elapse of the time $T_{C2}$ under this maximum constant-velocity control results in a position $X_{C2}$ at the point P2. A migration is then made to the deceleration control segment 164 where the decelerated acceleration. Al is derived from the same expression (2) as in the comparative example of FIGS. 2A to 2C, the decelerated acceleration A1 achieving a deceleration to ensure that after the duration $T_1$ from the time t2 to t4 the velocity of the head moving mechanism 76 results in a constant minimum velocity $V_C$ which allows a migration to the track following control. Then, in the same manner as the comparative example of FIGS. 2A to 2C, the expression (1) provides a target acceleration signal A(t) for the elapsed time t and a target velocity signal V(t) for the elapsed time t. The elapsed time t based signal of this target acceleration signal A(t) is a decelerated acceleration target trajectory signal, whilst the target velocity signal V(t) is a target velocity trajectory signal for the elapsed time t. This means that the acceleration feedforward control and the velocity feedback control based on the target acceleration signal A(t) and the target velocity signal V(t) are provided at the same time in the deceleration control segment 164. The deceleration control in the deceleration control segment 164 is thus provided so that at the time t4 after the elapse of the time T1 the velocity reaches a constant velocity $V_C$ which allows a migration to the track following control, with zero acceleration and with the position X1' at the point P3. Then the control migrates to the minimum constant-velocity control segment 166 where a velocity control is provided at a constant target velocity $V_C$ achieving the minimum velocity of the head moving mechanism 76, with the position increasing linearly with respect to the time t from the position X1' at the start time t4 of the minimum constant-velocity segment 166. Herein, let. $X_2$ be the position, e.g., one-track precedent to the target track, then the migration to the track following control is effected at the point of time when the detection has been made of the arrival of the head moving mechanism 76 at the one-track precedent position $X_2$ at the time t5 after the elapse of the time $T_{C1'}$. The time $T_{E'}$ from the seek start time t0 to the migration start time t5 at which migration to the track following control has been started is expressed by $$T_E=T_0+T_{C2}+T_1+T_{C1'}. \tag{6}$$

A track lead-in time not ;shown is added to this time $T_{E'}$ to obtain the total seek time. It will be seen that the relationship $(T_{E'}>T_E)$ lies with respect to the time $T_E$ from the seek start time t0 to the migration time t6 to the track following control, indicated by the dotted lines corresponding to the comparative example of FIGS. 2A to 2C. Thus, according to the seek control having the maximum constant-velocity control segment 162 interposed between the acceleration segment 160 and the deceleration segment 164, sufficient seek time reducing effects are obtained as compared with the seek control of the comparative example of FIGS. 2A to 2C having no maximum constant-velocity control segment. A detailed description will then be made of the adjusting time $T_{C2}$ in the maximum constant-velocity segment for shortening the seek time. The positions $X_0$, $X_{C2}$ and $X_1$ of the head moving mechanism 76 at the termination time t1 of the acceleration control segment, the termination time t2 of the maximum constant-velocity control segment and the termination time t4 of the deceleration segment of FIG. 9C are given by the following expressions:

$$X_0=\tfrac{1}{2}A_0T_0^2 \tag{7}$$

$$X_{C2}=X_0+A_0T_0T_{C2}=\tfrac{1}{2}A_0T_0^2+A_0T_{C2} \tag{8}$$

$$X_1' = X_{C2} + \int_0^{T_1} V(t)\,dt = \tfrac{1}{2}A_0T_0^2 + A_0T_0T_{C2} + A_0T_0T_1 + \tfrac{1}{3}A_1T_1^2 \tag{9}$$

When eliminating the acceleration $A_1$ from the expressions (2) and (5), $$X_1'=\tfrac{1}{2}A_0T_0T_{C2}+\tfrac{2}{3}V_CT_1+\tfrac{1}{3}A_0T_0T_1 \tag{10}$$

results.

Since the comparative example of FIGS. 2A to 2C has no maximum constant-velocity segment, the time $T_{C2}=0$. Hence this is placed into the expression (10) to obtain $$X_1=\tfrac{1}{2}A_0T_0^2+\tfrac{2}{3}V_CT_1+\tfrac{1}{3}A_0T_0T_1 \tag{11}$$

Then, in the case of application of the present invention, the position of the head moving mechanism 76 under the constant-velocity control at the velocity $V_C$ after the termination of the deceleration control segment is given by the following expression using the elapsed time t from the time t4.

$$X(t)=X_1'+V_Ct=\tfrac{1}{2}A_0T_0^2+A_0T_0T_{C2}+\tfrac{2}{3}V_CT_1+\tfrac{1}{3}A_0T_0T_1+V_Ct \tag{12}$$

Herein, $X(t)=X_2$ results when $t=T_{E'}-(T_0+T_{C2}+T_1)$, and hence this is placed into the expression (12) to obtain the position $X_2$ as $$X_2=\tfrac{1}{2}A_0T_0^2+A_0T_0T_{C2}-\tfrac{1}{3}V_CT_1+\tfrac{1}{3}A_0T_0T_1+V_C(T_{E'}-T_0-T_{C2}) \tag{13}$$

The target velocity signal X(t) in the deceleration segment in the case of comparative example of FIGS. 2A to 2C is given as $$X(t)=X_1+V_Ct=\tfrac{1}{2}A_0T_0^2+\tfrac{2}{3}V_CT_1+\tfrac{1}{3}A_0T_0T_1V_Ct \tag{14}$$

When $t=T_E-(T_0+T_1)$, $X(t)=X_2$ results. This is placed into the expression (14) to obtain the position $X_2$ as $$X_2=\tfrac{1}{2}A_0T_0^2-\tfrac{1}{3}V_CT_1+\tfrac{1}{3}A_0T_0T_1+V_C(T_E-T_0-) \tag{15}$$

At that time, with the assumption that the right sides of the expressions (13) and (14) are equal to each other, $V_D=A_0T_0$ of the expression (5) is placed thereinto to obtain the time $T_{E'}$ taken to reach the position $X_2$ in accordance with the present invention, as $$T_E' = T_E - \frac{(V_D - V_C)}{V_C}T_{C2} \tag{16}$$

This expression (16) means that when the velocity $V_D$ achieved under the acceleration control after the start of seek is larger than the final target velocity $V_C$ after the termination of the deceleration, the seek time $T_{E'}$ of the present invention is shortened relative to the seek time $T_E$ of the comparative example, in proportion to the length of the constant velocity control time $t_{C2}$ during the migration from the acceleration control to the deceleration control. Thus, by setting arrival velocity $V_D$ after the termination of the acceleration to a sufficiently larger value than the final target velocity $V_C$, the present invention can achieve a more significant seek time reducing effect.

Due to the presence of its maximum acceleration limitation, the decelerated acceleration $A_1$ acquired herein from the expression (2) as, e.g., $$A_1 = \frac{2(V_C - V_D)}{T_1} > -A_0 \tag{17}$$

the region capable of defining the velocity $V_D$ is expressed by $$V_C<V_D<V_C+A_0T_1 \tag{18}$$

Due to the necessity to meet the condition $X(O)<X_2$, i.e., the condition that the position of the head moving mechanism 76 does not reach the one-track-precedent position $X_2$ by the termination of the deceleration control, the next expression must be satisfied.

$$X_2 > \tfrac{1}{2}A_0T_0^2 + \tfrac{2}{3}V_CT_1 + \tfrac{1}{3}A_0T_0T_1 + A_0T_0T_{C2} \qquad (19)$$

The right side of the expression (19) is X(t) when t=0 in the expression (14). Thus, when placing $V_D = A_0T_0$ of the expression (5) into the expression (19), the relation of the maximum constant-velocity segment to the time $T_{C2}$ is summarized as $$0 < T_{C2} < \frac{3X_2 - 2V_CT_1}{V_D} - \tfrac{1}{2}T_0 - \tfrac{1}{3}T_1 \qquad (20)$$

which represents the definitive region of the constant-velocity control time $T_C$. Thus, by setting the constant-velocity control time $t_{C2}$ for the distance $X_2$ conforming to the distance to the target track, as $$T_{C2} = \frac{3X_2 - 2V_CT_1}{3V_D} - \tfrac{1}{2}T_0 - \tfrac{1}{3}T_1 \qquad (21)$$

the seek time $T_{E'}$ of the present invention can be minimized. This expression (21) is modified to allow the right side to have only the term of $V_D$ as $$T_{c2} + \tfrac{1}{2}T_0 + \tfrac{1}{3}T_1 = \frac{X_2 - (2/3)V_CT_1}{V_D}$$

Herein, let the offset time $T_{ofst}$ and the offset distance $X_{ofst}$ be $$T_{ofst} = \tfrac{1}{2}T_0 = \tfrac{1}{3}T_1 \qquad (22)$$

$$X_{ofst} = \tfrac{2}{3}V_CT_1 \qquad (23)$$

respectively, then the following expression is obtained.

$$T_{c2} + T_{ofst} = \frac{X_2 - X_{ofst}}{V_D} \qquad (24)$$

That is, it can be seen that the time obtained by adding the offset time $T_{ofst}$ to the optimum time $T_{C2}$ is proportional to the distance obtained by subtracting the offset distance $X_{ofst}$ from the seek distance $X_2$ but is inversely proportional to the maximum target velocity $V_D$ detected.

Herein, the numerator of the right side of the expression (24) can take the following values in the case of, e.g., 0.9 μm track pitch medium short-distance seek.

|  | [Track Count] | [Seek Distance $X_2$] | [$X_{ofst}$] | [$X_2 - X_{ofst}$] |
|---|---|---|---|---|
| Min | 10 | 9 μm | 8 μm | 1 μm |
| Max | 50 | 45 μm | 8 μm | 37 μm |

Since in fact $T_0$, $T_1$ and $V_C$ are given as constants in the expression (24), detection is made of the seek distance $X_2$ which is the position one-track precedent to the target track position and the velocity $V_D$ upon the termination of the acceleration control. The results are placed into the expression (24) for solution, to obtain the optimum acceleration control time $t_{C2}$. Although the expression (19) has additionally had the condition that the head moving mechanism 76 does not reach the target track by the termination of the deceleration control, the deceleration control may be halted the instant that the position of the head moving mechanism 76 reaches the position $X_2$ one-track precedent to the target track irrespective of the termination of the deceleration control, and the migration to the track following control may instead be commenced, whereby it is possible to set an even larger value as the constant-velocity control time $T_{C2}$ to thereby enable the seek time to further be shortened.

In the event that the velocity of the head moving mechanism 76 lies within the range making the migration to the track following control hard, the target velocity $V_C$ has only to be set to a lower value for use in the minimum constant-velocity segment 166. In case of determining the constant-velocity control time $T_{C2}$ from the expression (24) under the conditions such as disturbances, the margin is increased if there is a possibility to reach the target track before the termination of the deceleration control. The adjustment of this margin is effected by the regulation of the offset time $T_{ofst}$ of the expression (24). That is, a larger value of the offset time $T_{ofst}$ than the given value of the expression (22) will reduce the time $T_{C2}$ and hence increase the margin. The constant-velocity control time $T_{C2}$ obtained by use of the expression (24) may be arithmetically determined every time through detection of the seek distance and of the velocity upon the termination of acceleration in the seek control. In the event of determining the velocity $V_D$ upon the termination of acceleration as a fixed value for example, use may be made of the table storing the values of the constant-velocity control time $T_{C2}$ obtained from the expression (21) with the seek distance to the target track as the index, so as to set the optimum constant-velocity control time $T_{C2}$ through the reference to the table. Although the seek control of FIGS. 9A to 9D is the acceleration control based on only the acceleration feedforward signal from the target acceleration generator 130 with the switch 128 opened in the acceleration control segment 160, the switch 128 may be closed in the acceleration control segment so that the target velocity generator 122 issues a target velocity signal resulting in V(t)=AOt on the basis of the elapsed time and that the velocity feedback control is simultaneously applied to the target velocity signal.

According to the present invention, as set forth hereinabove, in order to prevent any influences of noises which may occur in the event of a relatively lower velocity, the target velocity and the target acceleration are generated on the basis of the elapsed time in the seek control, with the provision of the maximum constant-velocity control segment interposed between the acceleration control segment and the deceleration control segment of the seek control section, for the constant-velocity control at the maximum velocity upon the termination of acceleration. The duration of the maximum constant-velocity control segment is set adjustably to the optimum time which is proportional to the distance to the target track but inversely proportional to the maximum velocity whereby it is possible to minimize the duration of the minimum constant-velocity segment allowing the migration to the track following control in spite of a longer seek distance and to reduce the seek time while ensuring the stability of migration to the track following control from the seek control.

By virtue of this, in the magneto-optical disk provided with the seek control of the present invention, a remarkable improvement is expected of rapidness upon the data read and write by the reduced seek time, contributing to the improvement in performances of the entire apparatus.

Although the above embodiment has been directed to the case of application of the seek control of the present invention to the short seek effecting the seek of 10 to 50 tracks on the 0.9 μm track pitch medium, the number of tracks defining the short seek range may differ depending on a track pitch of the medium.

Although the above embodiment has been directed to the seek control of the optical disk apparatus by way of example, it may be directed to the magnetic disk apparatus. In such a case, the magnetic head seek control is provided in which the information is electrically picked up in place of the optical information pickup from the medium by the optical head in the case of the optical disk apparatus.

Although the above embodiment has been directed by way of example to a so-called single servo of the head moving mechanism moved in a radial direction of the medium under the seek control and provided fixedly with the objective lens, the present invention is applicable also to a so-called double servo seek control providing the servo control of the head moving mechanism fitted with both a carriage moving in a radial direction of the medium and with a track actuator for moving the direction of the optical axis of the objective lens relative to a radial direction of the medium on the carriage.

The present invention encompasses any appropriate variants without impairing its objects and advantages and is not limited by the numerical values indicated by the above embodiment.

What is claimed is:

1. A storage device providing a seek control for moving a head moving mechanism in a track crossing direction of a medium through a drive of an actuator to position said head moving mechanism at a target track, said storage device comprising:

a seek control unit which divides a seek control section into four segments, including, an acceleration control segment, a maximum constant-velocity control segment, a deceleration control segment and a minimum constant-velocity control segment, said seek control unit providing a control of said four control segments depending on the elapsed time from the start of seek; and a time tuning unit which tunes the time of said maximum constant-velocity control segment into the optimum time for shortening the time of said minimum constant-velocity control, said time tuning unit setting said tuned time for said maximum constant-velocity control segment.

2. A storage device according to claim 1, wherein said time tuning unit makes such a tuning as to allow the sum of said optimum time of said maximum constant-velocity control segment and a predetermined offset time to be proportional to a distance when subtracting a predetermined offset distance from a seek distance but inversely proportional to a target maximum velocity.

3. A storage device according to claim 2, wherein said time tuning unit uses as the time of said maximum constant-velocity control segment a tuned time obtained as a result of reduction of the optimum time by addition of a desired margin in the form of increase of said offset time, said optimum time being determined from said seek distance and said target maximum velocity.

4. A storage device according to claim 1, wherein said seek control unit includes:

an acceleration control unit which provides an acceleration control of said actuator by a predetermined target acceleration $A_0$ in said acceleration control segment;

a maximum constant-velocity control unit which provides a constant-velocity control of said actuator so as to allow a maximum velocity $V_D$ upon the termination of said acceleration control to be kept as a target velocity;

a decelerated acceleration trajectory control unit which in said deceleration segment, generates based on the elapsed time a target decelerated acceleration trajectory for deceleration within a predetermined time to a predetermined minimum velocity $V_C$ which allows a migration to a track following control with a predetermined decelerated acceleration $A_1$ as its initial value, to thereby provide a deceleration control of said actuator;

a velocity trajectory control unit which in said deceleration control segment, generates based on the elapsed time a target velocity trajectory which lowers depending on said target: decelerated acceleration trajectory with said maximum velocity $V_D$ as its initial value, to thereby provide a velocity control of said actuator; and a minimum constant-velocity control unit which provides a constant-velocity control of said actuator in said minimum constant-velocity control segment till the start of a track following control immediately precedent to a target track, with said minimum velocity $V_C$ as its target velocity.

5. A storage device according to claim 1, further comprising:

a velocity feedback control unit which includes a position detector detecting the radial position of a head from a tracking error signal, a velocity detector detecting the velocity of said head in the track crossing direction from said tracking error signal, and a target velocity generator generating a target velocity signal based on the elapsed time, said velocity feedback control unit generating a velocity feedback signal from a velocity error between said target velocity and said head velocity to thereby provide a control of said head moving mechanism; and an acceleration feedforward control unit which includes a target acceleration generator generating a target acceleration signal based on the elapsed time, said acceleration feedforward control unit issuing for acceleration control said target acceleration signal as an acceleration feedforward signal to said head moving mechanism, and wherein said maximum constant-velocity control unit and said minimum constant-velocity control unit are incorporated in said velocity feedback control unit, said acceleration control unit and said deceleration control unit being incorporated in said acceleration feedforward control unit in the form of its functions, and wherein said velocity feedback signal is added via a switch to said acceleration feedforward signal, the resultant signal being fed as a seek control signal to said head moving mechanism, said switch being turned off in said acceleration control segment, said switch turned on in said maximum constant-velocity control segment, said deceleration control segment and minimum constant-velocity control segment.

6. A storage device according to claim 1, wherein said seek control unit makes a changeover from said acceleration control segment to said maximum constant-velocity control segment upon the movement through a predetermined distance from the start of seek control.

7. A storage device according to claim 1, wherein
said head is moved in a radial direction of the medium with an optical pickup optically detecting information of record tracks on said medium or with a magnetic pickup magnetically detecting the same, said optical or magnetic pick up being mounted on said actuator.

8. A seek control method for a storage device in which a head moving mechanism is moved in a track crossing direction of a medium through a drive of an actuator so that said head moving mechanism is positioned at a target track, said method comprising:
- a control step which includes dividing a seek control section into four segments, including, an acceleration control segment, a maximum constant-velocity control segment, a deceleration control segment and a minimum constant-velocity control segment, to provide a control of said four control segments depending on the elapsed time from the start of seek; and
- a time tuning step which includes tuning the time of said maximum constant-velocity control segment into the optimum time for shortening the time of said minimum constant-velocity control, to set said tuned time for said maximum constant-velocity control segment.

9. A seek control method according to claim 8, wherein said time tuning step includes making such a tuning as to allow the sum of said optimum time of said maximum constant-velocity control segment and a predetermined offset time to be proportional to a distance when subtracting a predetermined offset distance from a seek distance but inversely proportional to a target maximum velocity.

10. A seek control method according to claim 8, wherein said time tuning step includes using as the time of said maximum constant-velocity control segment a tuned time obtained as a result of reduction of the optimum time by addition of a desired margin in the form of increase of said offset time, said optimum time being determined from said seek distance and said target maximum velocity.

11. A seek control method according to claim 8, wherein said control step includes:
- an acceleration control step which includes providing an acceleration control of said actuator by a predetermined target acceleration $A_0$ in said acceleration control segment;
- a maximum constant-velocity control step which includes providing a constant-velocity control of said actuator so as to allow a maximum velocity $V_D$ upon the termination of said acceleration control to be kept as a target velocity;
- a decelerated acceleration trajectory control step which includes, in said deceleration segment, generating based on the elapsed time a target decelerated acceleration trajectory for deceleration within a predetermined time to a predetermined minimum velocity $V_C$ which allows a migration to a track following control with a predetermined decelerated acceleration $A_1$ as its initial value, to thereby provide a deceleration control of said actuator;
- a velocity trajectory control step which includes, in said deceleration control segment, generating based on the elapsed time a target velocity trajectory which lowers depending on said target decelerated acceleration trajectory with said maximum velocity $V_D$ as its initial value, to thereby provide a velocity control of said actuator; and
- a minimum constant-velocity control step which includes providing a constant-velocity control of said actuator in said minimum constant-velocity control segment till the start of a track following control immediately precedent to a target track, with said minimum velocity $V_C$ as its target velocity.

12. A seek control method according to claim 8, further comprising:
- a velocity feedback control step which includes having a position detector detecting the radial position of a head from a tracking error signal, a velocity detector detecting the velocity of said head in the track crossing direction from said tracking error signal, and a target velocity generator generating a target velocity signal based on the elapsed time, said velocity feedback control step including generating a velocity feedback signal from a velocity error between said target velocity and said head velocity to thereby provide a control of said head moving mechanism; and
- an acceleration feedforward control step which includes having a target acceleration generator generating a target acceleration signal based on the elapsed time, said acceleration feedforward control step including issuing for acceleration control said target acceleration signal as an acceleration feedforward signal to said head moving mechanism, and wherein
- said maximum constant-velocity control step and said minimum constant-velocity control step are incorporated in said velocity feedback control step, said acceleration control step and said deceleration control step being incorporated in said acceleration feedforward control step in the form of its functions, and wherein
- said velocity feedback signal is added via a switch to said acceleration feed forward signal, the resultant signal being fed as a seek control signal to said head moving mechanism, said switch being turned off in said acceleration control segment, said switch turned on in said maximum constant-velocity control segment, said deceleration control segment and minimum constant-velocity control segment.

13. A seek control method according to claim 8, wherein said seek control step including making a changeover from said acceleration control segment to said maximum constant-velocity control segment upon the movement through a predetermined distance from the start of seek control.

14. A seek control method according to claim 8, wherein said head is moved in a radial direction of the medium with an optical pickup optically detecting information of record tracks on said medium or with a magnetic pickup magnetically detecting the same, said optical or magnetic pickup being mounted on said actuator.

* * * * *

UNITED STATES PATENT AND TRADEMARK OFFICE
CERTIFICATE OF CORRECTION

PATENT NO. : 6,327,229 B1
DATED : December 4, 2001
INVENTOR(S) : Kawabe

It is certified that error appears in the above-identified patent and that said Letters Patent is hereby corrected as shown below:

<u>Column 20,</u>
Line 42, delete "feed forward" and insert -- feedforward -- therefor.

Signed and Sealed this

Fourth Day of June, 2002

Attest:

JAMES E. ROGAN
Attesting Officer    Director of the United States Patent and Trademark Office